(12) United States Patent
Chawla et al.

(10) Patent No.: US 7,564,872 B1
(45) Date of Patent: Jul. 21, 2009

(54) APPARATUS AND METHODS FOR PROVIDING EVENT-BASED DATA COMMUNICATIONS DEVICE CONFIGURATION

(75) Inventors: Hamesh Chawla, San Leandro, CA (US); John G. Waclawsky, Fredrick, MD (US)

(73) Assignee: Cisco Technology, Inc., San Jose, CA (US)

( * ) Notice: Subject to any disclaimer, the term of this patent is extended or adjusted under 35 U.S.C. 154(b) by 920 days.

(21) Appl. No.: 10/889,390

(22) Filed: Jul. 12, 2004

Related U.S. Application Data

(63) Continuation of application No. 09/358,084, filed on Jul. 21, 1999, now Pat. No. 6,771,661.

(51) Int. Cl.
*H04L 3/16* (2006.01)
(52) U.S. Cl. ...................... 370/468; 709/226
(58) Field of Classification Search ............ 370/465, 370/468; 709/226
See application file for complete search history.

(56) References Cited

U.S. PATENT DOCUMENTS

| | | | |
|---|---|---|---|
| 5,745,694 A * | 4/1998 | Egawa et al. | 709/225 |
| 6,374,288 B1 * | 4/2002 | Bhagavath et al. | 709/203 |
| 6,453,151 B1 * | 9/2002 | Kiang et al. | 455/67.11 |
| 6,754,189 B1 * | 6/2004 | Cloutier et al. | 370/329 |
| 6,788,651 B1 * | 9/2004 | Brent et al. | 370/255 |

* cited by examiner

*Primary Examiner*—Andrew Lee
(74) *Attorney, Agent, or Firm*—Brinks Hofer Gilson & Lione

(57) ABSTRACT

A system and method are provided which enable a data communications device to be programmed to automatically and dynamically modify allocation of resources upon the occurrence of specific events or times without having to break active sessions of data communications. Resource allocations can be made by bandwidth reservations provided to a data communications device via a network policy or via individual bandwidth reservation messages. The bandwidth allocation information can specify a session of data communication and future bandwidth modification information, such as a time or event, that will cause the data communications device to modify an amount of bandwidth reserved for the specified session of data communications.

32 Claims, 7 Drawing Sheets

| 180 | 181 | 182 | 183 |
|---|---|---|---|
| RSVP HEADER | UDP | IP | DATA |

| 184 | 185 | 186 | 187 | 188 | 189 | 190 | 191 |
|---|---|---|---|---|---|---|---|
| VER | FLAGS | MSG TYPE | CHECKSUM | TTL | RESERVED | LENGTH | TSPEC |

510

400

| DATA TYPE | MODIFICATION INFORMATION (EVENT CONDITION OR TIME) | RESERVED BANDWIDTH |
|---|---|---|
| COMPUTER DATA | 12AM-6AM<br>7AM-5PM<br>5PM-12AM<br>5PM-10PM (INVENTORY UPLOAD) | 4 MBPS<br>2 MBPS<br>0 MBPS<br>4 MBPS |
| VOICE DATA | 12AM-6AM<br>7AM-5PM<br>5PM-12AM<br>EMERGENCY | 4 MBPS<br>2 MBPS<br>0 MBPS<br>2 MBPS |
| FACSIMILE DATA | 12AM-6AM (INCOMING FOREIGN)<br>12AM-7AM<br>7AM-5PM<br>5PM-7PM (DAILY REPORTS OUT)<br>7PM-12AM | 2 MBPS<br>0MBPS<br>2 MBPS<br>4MBPS<br>0MBPS |

NETWORK POLICY RESOURCE ALLOCATION TABLE

FIG. 5

APPARATUS AND METHODS FOR PROVIDING EVENT-BASED DATA COMMUNICATIONS DEVICE CONFIGURATION

RELATION TO CO-PENDING APPLICATION

This application is a Continuation of U.S. patent application Ser. No. 09/358,084 filed on Jul. 21, 1999, now U.S. Pat. No. 6,771,661 entitled, "Apparatus And Methods For Providing Event-Based Data Communications Device Configuration," which itself is related to U.S. patent application entitled "Apparatus and Methods for Dynamic Bandwidth Allocation," filed on May 24, 1999, and having U.S. Patent Office Ser. No. 09/317,381, the entire contents of both of which is incorporated herein by this reference.

BACKGROUND OF THE INVENTION

A typical data communications network includes many hosts interconnected by various data communication devices. The data communications devices can be routers, bridges, switches, access servers, gateways, hubs, concentrators, proxy servers, repeaters and so forth which exchange data over an interconnection of data links. The data links may be physical connections or may be provided using wireless communication mechanisms. The network allows data to propagate between various applications that execute on the hosts. The hosts are often general purpose computer systems such as personal computers, workstations, minicomputers, mainframes and the like, or the hosts may be more special purpose computer systems or dedicated devices such as web-site kiosks, facsimile or email servers, video servers, audio servers, and so forth. Each computer host couples either physically or via wireless data link to one or more of the data communications devices that form the network. By way of example, many businesses provide a network of computer hosts to allow employees of the business to exchange data, communicate and generally carry out the functions of the business.

Various physical or hardware data communications connection mechanisms allow the hosts to interconnect with the network. Physical data communications connection mechanisms can include modems, transceivers, network interface cards, fiber optic cards, ports and other hardware devices which allow data to be transferred at various data transfer rates (i.e., bandwidths) to and from the hosts and between the data communications devices. For example, certain hosts on a business network may have high-speed network interfaces which provide connections to the network at high data transfer rates such as fractional-T1, T1, E1 or higher, while other hosts may use inexpensive modems or network interface cards that provide much slower maximum data transfer rates to and from the network.

Depending upon a specific use of a host or group of hosts in a network, which often depends on an application running on the host(s), data traveling across portions of the network may require different levels of data service (i.e., data transfer rates or network bandwidth). For example, a backup server (e.g., a high powered computer containing large amounts of data storage) on a typical network used in a business may require a high speed connection to the network to perform nightly backups of data stored on each employee computer. The backup server may, for example, be connected to a fiber optic backbone in the network which offers very high speed data transfer rates. The high speed offered by the fiber optic backbone may allow, for example, data from many employee computers to be simultaneously backed-up by the backup server thus allowing completion of the data backup process for each employee computer before the start of the next business day.

As another example in the business network setting, certain employee computers which rely heavily on data communications applications may require high speed connections to the business network, while other employee computers used, for example, for administrative purposes, may only require low speed network connections. Employees such as engineers using the high speed data communications computers may require high speed network access, while administrative employees using administrative computers may only require minimal network access with low data transfer rates. Within the network itself however, the various data communications devices such as routers, switches and hubs, which channel the data across the network between computer hosts (either during nightly backups, or during the day for employee communications) must be able to distinguish and properly transmit the different flows of data from hosts that require different levels or qualities of data transfer service.

Since many connections, sessions or data traffic flows (i.e., data associated with an end-to-end application or stream) from multiple hosts with potentially different data rates are frequently switched, routed or transferred through the same data communication devices in a network, the data communications devices must provide a way to establish, allocate or reserve the bandwidth requirements for each flow, session, or connection. Once the bandwidth is allocated, the devices must distinguish the different data flows or connections requiring the different levels of service (i.e., different data rates or bandwidth requirements). Once distinguished, the data communications devices must service each connection or flow at its prescribed level of service. For example, if T1 data rates are required for the backup server, the data communications devices must identify and transport backup data through the network at T1 speeds, while other data that may also be present on the network is transferred at some other data rate, such as a "best-effort-only" data rate. Management of the various data transmission and propagation requirements associated with data having differing levels of service is a well known problem associated with data communications devices in modern networks.

Various bandwidth allocation or reservation protocols have been developed for use in modern networks to provide guaranteed Quality of Service (QoS) or controlled end-to-end delays for transmitted data. These protocols allow applications that exchange data between sending and receiving hosts (e.g., employee computers and the backup server) to establish reservations of bandwidth over the network for the various services required by the applications. One such protocol is called RSVP, which stands for the Resource ReSerVation Protocol.

As its name implies, computer hosts can use RSVP to request a specific QoS from the network on behalf of an application data stream. When a host needs bandwidth, the host transmits an RSVP bandwidth reservation request message on the network along the path of the session of data communications. RSVP processes in each data communications device in the network propagate the request through the network to each data communications device (e.g., router, switch, hub) or node that the network uses to transport the session data. At each node, the RSVP process for that node attempts to make a resource (i.e. bandwidth) reservation for the stream specified in the RSVP request at that moment in time. As bandwidth is successfully reserved in each node on the network path from sending host to receiving host, the data associated with the session of data communications can use the reserved network bandwidth, while other data streams are excluded from using the reserved bandwidth resources. In other words, the QoS (e.g., data rate or allocated bandwidth) for that stream is generally guaranteed since the bandwidth is reserved in each node for use by that particular stream (e.g., backup data) and no other. When the sending and receiving hosts no longer require the use of the reserved bandwidth, the hosts mutually agree to release the reserved bandwidth via a series of RSVP un-reserve (i.e., tear-down) protocol messages sent to each data communications device on the path of the reserved data. The data communications devices receive the RSVP un-reserve (tear-down) messages and release the formerly reserved bandwidth resources, allowing these resources to be used for the transfer of other data.

FIG. 1 illustrates a typical architecture and data flow of a prior art data communications device 100 configured to use RSVP. Traditionally, to make a resource reservation in the data communications device 100 (e.g. a router), an RSVP process 101 executing on the device 100 receives an RSVP request (not shown) from a host and communicates this request to two local decision modules, admission control 102 and policy control 103. Admission control 102 determines whether the device 100 has sufficient available resources (e.g., buffer capacity, processor and I/O bandwidth) to supply the requested QoS. Policy control 103 determines whether a user, host or application (typically on another device or host) requesting the bandwidth reservation has administrative permission (i.e. access control) to make the reservation. If either check fails, the RSVP process 101 returns an error notification to the application process that originated the request. If both the admission and policy control checks succeed, the RSVP process 101 defines a set of filterspec parameters provided to a packet classifier 104 and a set of flowspec parameters provided to the packet scheduler 106 to configure and obtain the desired QoS in the device 100 for that stream.

The packet classifier 104 uses the filterspec parameters to filter each packet (data in) that arrives at the device to determine the route and queue for the packet within the data queuing mechanism 105. For example, there may be many prioritized queues, each providing a specific level of service or QoS. The packet scheduler 106 uses the flowspec parameters to properly service the queues in the data queuing mechanism 105 to achieve the promised QoS for each stream. Typically, the packet scheduler 106 employs a weighted fair queuing algorithm to de-queue the data from the various queues in the data queuing mechanism 105 according to the bandwidth allocation requirements or QoS defined in the flowspec parameters.

FIG. 2 illustrates a prior art packet data structure 510 used to transport data in a data stream for which RSVP has reserved bandwidth in data communications device 110. The data packet 510 includes an RSVP header field 180 followed by UDP and IP headers 181, 182 and the data 183. The RSVP header 180 typically includes various fields 184 through 191. Of particular interest is the Tspec field 191 which provides a description or identification of the traffic flow, session, or data stream to which this data packet 510 is associated. The packet classifier 104 and the packet scheduler 106 can use the Tspec field 191 to identify different flows of data and enforce the bandwidth allocations or QoS for each identified flow.

SUMMARY OF THE INVENTION

Current implementations of bandwidth or resource reservation protocols such as RSVP are fraught with a number of limitations. Overall, the RSVP protocol is static in nature. That is, for each different bandwidth reservation, one or more RSVP protocol path and reservation messages must be communicated between the sending and receiving hosts and all of the data communications devices (e.g. routers, switches, hubs, and so forth) on the path that the data is to take through a network. Thus, once RSVP is used to reserve bandwidth for a particular stream of data, to change the amount of reserved bandwidth requires a new series of RSVP messages to be exchanged, as explained above. No mechanism is provided in current implementations of bandwidth reservation protocols such as RSVP to automatically adjust amounts of reserved bandwidth in data communications devices on-the-fly, without further communications via the reservation protocol.

The RSVP protocol does not define when or how a data communications device (e.g. 100 in FIG. 1) is to implement the actual bandwidth reservations allocated to a session or flow of data communication between hosts. Rather, RSVP simply provides a mechanism to exchange bandwidth reservation and path messages along the path of data communication between sending and receiving hosts. The reservation messages simply identify a session or stream of data communication and indicate a requested level of service for that stream of data. The path messages indicate where the data is to come from and also indicate where to transmit the data.

Since no time limitations are provided in the RSVP protocol, current implementations of RSVP processing interpret RSVP request messages immediately which results in immediate reservations of bandwidth if the request is allowed. That is, a data communications device that receives an RSVP request for a bandwidth reservation performs the policy and admission control processing essentially at the moment the RSVP request is received. If the amount of bandwidth reserved via RSVP is not actually needed until a later point in time (i.e., transmission of the session of data communications that will use the bandwidth has not yet commenced), current implementations of reservation protocols such as RSVP have no way to specify reservations that are to made in the future via information in the RSVP request messages. Currently therefore, bandwidth is reserved in the device even though its actual use may not be needed until a later point in time.

Furthermore, RSVP does not specify the mechanisms to actually set aside or reserve the bandwidth resources within the device itself. Rather, they are dependant upon the implementation of the data communications devices that must interpret the protocol and reserve resources in any particular manner in which they chose.

Accordingly, RSVP only provides a framework for hosts to notify and request immediate reservations of bandwidth in all data communications devices that are on paths between sending and receiving hosts. Once the data communications devices have agreed to reserve the requested bandwidth at the time the RSVP message is received (i.e., admission and policy control), the implementation of how that bandwidth is actually reserved or set aside within each device is left up to the device and is not part of the RSVP protocol. The previously described prior art implementations of device bandwidth reservation mechanisms using customized packet classifiers and packet schedulers which operate in conjunction with the RSVP protocol have become quite popular.

However, another problem that stems from these prior art implementations is that they do not allow adjustments to be made to the amount of bandwidth reserved to a session of data communication over a period of time without requiring the session to be interrupted. That is, once the prior art implementations of bandwidth reservation techniques (i.e. modified classifiers and schedulers) reserve a set amount of bandwidth between two or more hosts immediately upon receipt of the reservation messages, the prior art implementations cannot later adjust the amount of reserved bandwidth via another set of RSVP messages without clearing the session from end-to-end of all data in the path(s) between sending and receiving hosts. This essentially requires the sender(s) to stop sending session data to provide time for all session data in the network to clear and reach the intended receiver(s). In other words, if the bandwidth or QoS requirements of a session need to change over time (e.g., a receiving host determines later that it actually needs more bandwidth to properly receive a stream after the initial reservation request has been completed), a new RSVP negotiation must take place that requires the sending host to halt data transmission for a period of time, while the sending and receiving hosts, and all data communication devices in between, clear themselves of the session data. Then, the sender and receiver must use another set of RSVP reservation and path messages to adjust (i.e., increase or decrease) the amount of bandwidth allocated between the sender and receiver hosts to meet the new requirements at that point in time.

One reason that current implementations of RSVP do not allow future bandwidth adjustments to be made once a communication session is in progress is not completely due to limitations of the RSVP protocol. The design of prior art data communications devices that support RSVP also contributes to these limitations. In the prior art systems that support RSVP (such as that shown in FIG. 1), a customized data classifier 104 and scheduler 106 handle RSVP bandwidth reservation requests and enforce the bandwidth allocation requirements. The RSVP process 101 periodically updates the customized classifier 104 with filterspec information which allows the classifier 104 to properly examine and classify packets of data with the flow identification associated with the packets. If a packet is associated with a flow of data for which bandwidth has been allocated via RSVP, the customized classifier 104, for example, directs this packet to a queue reserved for this flow. Once queued, the customized scheduler 106 typically uses a weighted fair queuing algorithm to dequeue the data from the various queues according to the bandwidth allocation requirements associated with the various flows of data in relation to each queue as defined by the flowspec requirements.

By way of example, if the classifier 104 identifies data associated with a session having a high bandwidth reservation, the classifier 104 may queue the data in a high bandwidth queue. The scheduler 106 may service the high bandwidth queue more frequently than other queues which may have lower bandwidth allocations or reservations which are serviced less frequently. Since the classifier, the scheduler, and sometimes the queuing structure are all involved in prior art device specific implementations of bandwidth reservation using RSVP, data associated with a specific data communications session may exist in any one of these components in the device at any point in time. Hence, if the prior art RSVP process 101 were to attempt to dynamically or automatically change the allocation of reserved bandwidth during an active session of data communication, the scheduler 106 might need to reconfigure queuing structures and the classifier 104 might need to be made aware of the new bandwidth allocation scheme for that session. If such a reconfiguration were attempted during the transfer of session data, significant delays and/or lost data would result for data flows having data that is buffered in the data communications device.

To avoid such losses or delays of data, prior art implementations of RSVP require that the sending host halt the transmission of data and that all data be flushed through the network to the receiver. Once the prior art devices clear the network of any data associated with a specific session of data communication, the prior art devices use another sequence of RSVP messages to adjust bandwidth and establish a new session. Once the prior art devices have established a new bandwidth allocation, a new session of data communication must be reinitiated. This explains why current RSVP protocols and prior art implementations of RSVP in data communications devices do not support the ability to designate future adjustments of modifications that should be made to amounts of reserved bandwidth. That is, since prior art implementations require the session of data communications to generally be broken in order to adjust bandwidth, no implementation of automatic, programmable or future adjustments to bandwidth are provided.

Conversely, the present invention provides techniques which allow a bandwidth reservation protocol such as RSVP to specify future resource reservations and a time at which those reservation should be made, or to specify a time at which a resource reservation (that is either currently reserved or is specified for future reservation in the same reservation message) should be modified. This allows, for example, conservation of network bandwidth since bandwidth is only actually reserved in network devices (e.g., routers, network access servers) at the specified time period(s).

The present invention also avoids the prior art situation of requiring a tear-down or break in a data communication session in order to re-allocate or adjust bandwidth reserved for a session. The present invention provides a device implementation of RSVP that can accept bandwidth allocation changes and can dynamically adjust bandwidth based on different times or events during an active session of data communication without requiring a pause or break in the transmission of data along the entire path of data transmission from sender(s) to receiver(s).

More specifically, embodiments of the present invention provide methods for controlling bandwidth allocation within a data communications device. The methods are generally performed by computing resources within a data communications device. One such method includes the steps of receiving, in the data communications device, bandwidth allocation information indicating future bandwidth allocation modification information associated with a session of data communication. The data communications device of the invention can then determine a future event upon the occurrence of which, the data communications device will modify an amount of bandwidth allocated to the session of data communication. The future event is determined based upon the future bandwidth allocation modification information. The data communications device can then detect the occurrence of the future event in the data communications device and in response to detecting the event, can modify the amount of bandwidth allocated to the session of data communications in the data communications device. In this manner, a data communications device is able to be programmed with bandwidth reservation information that changes, for instance, at certain times defined in the future bandwidth modification information or upon the occurrence of certain specified events.

The bandwidth allocation information may be received in the form of a bandwidth reservation message(s) identifying a session of data communication, an amount of bandwidth to reserve in the data communications device for the session of data communication, and the future bandwidth allocation modification information. Preferably, the bandwidth reservation message is an RSVP reservation message and includes extensions provided by this invention. For instance, an RSVP message indicating future modification information such as a time or event upon the occurrence of which the RSVP bandwidth reservation should be modified is included as an embodiment of this invention.

The future bandwidth allocation modification information can specify predetermined event information upon which the future event is to be determined, and also can specify a bandwidth modification amount indicating an amount by which the amount of bandwidth allocated to the session of data communications should be modified. The predetermined event information can specify, for example, a measure of time in which case the future event is a future time and is determined based on the measure of time specified in the predetermined event information.

Alternatively, the predetermined event information can define a detectable business cycle in which case the future event is a future time and is determined based on detection of the detectable business cycle. In another alternative, the data communications device can receive the bandwidth allocation information from a network policy server in the form of a network policy indicating when and by how much bandwidth the data communications device is to modify the amount of bandwidth allocated to a session of data communication. A network policy server may provide such information, network wide, to configure all data communications devices similarly. The network policy can specify a plurality of sessions of data communications, and for each of the plurality of sessions of data communication, can also specify various amounts of bandwidths to be allocated for each session of data communication at various times of operation of the data communications device.

Thus a network-wide policy that indicates at what times or on upon what events bandwidths or other resources (e.g., choice of routing algorithms, drop policies, error correction algorithm selections, data rates, as so forth) are to be selected can be propagated to each data communications device in a network. Each data communications device can monitor the policy and adjust its configuration upon the occurrence of times or events specified in the policy. In a business environment, for example, the network policy can specify various amounts of bandwidth to be allocated at various times of a day for various data types according to a business cycle for a business operating the data communications device.

The bandwidth allocation information can also be received in the form of a network policy template, in which case the bandwidth allocation modification information includes parameters to be used by the data communications device when determining future events. For example, the data communications device can use a bandwidth prediction algorithm in conjunction with the network policy template and the parameters in the bandwidth allocation information to compute future events specifying when and by how much bandwidth the data communications device is to modify the amount of bandwidth allocated to the session of data communication. Bandwidth prediction algorithms can provide a statistical analysis of the network and can thus determine when bandwidth requirements are high or low for various data types transferred on the network.

Another method is provided by the invention for dynamically adjusting configuration of a data communications device. This method includes the operations of operating a data communications device according to a first configuration which specifies resources within the data communications device to use in transferring data through the data communications device. The first configuration can be a current bandwidth reservation scheme that is already in place within a data communications device, for example. The operation of this method then receives, in the data communications device, configuration change information specifying predetermined modification information specifying a time or event at which to alter the first configuration of the data communications device. The operation then alters the first configuration of the data communications device at the specified time or event to produce a second configuration which specifies device resources within the data communications device to use in transferring data through the data communications device that are different than what was specified in the first configuration. In this manner, the invention allows a device to be programmed once with a first configuration which can automatically be modified into the second configuration without having to re-communicate or re-program the device.

The invention also provides a data communications device which includes an input port that receives bandwidth allocation information indicating future bandwidth allocation modification information associated with a session of data communication. A data transporter coupled to the input port is included, as is a bandwidth reservation processor coupled to the input port and the data transporter. The bandwidth reservation processor receives the bandwidth allocation information from the input port and determines a future event, upon the occurrence of which the bandwidth reservation processor will modify an amount of bandwidth allocated to the session of data communication in the data transporter. The future event is preferably determined based upon the future bandwidth allocation modification information.

In operation, the bandwidth reservation processor detects the occurrence of the future event in the data communications device and, in response to the detecting operation, the bandwidth reservation processor modifies the amount of bandwidth allocated to the session of data communications in the data transporter. The data communications device is thus able to automatically and dynamically adjust bandwidth information without continuous communication concerning bandwidth adjustments provided by hosts or terminals within a network.

The data communications device also includes a computer readable storage area coupled to the bandwidth reservation processor. The bandwidth reservation processor also includes a bandwidth request handler coupled to the input port. The bandwidth request handler receives and stores the bandwidth allocation information in a resource allocation table maintained in the computer readable storage area. A bandwidth labeler is provided and is coupled to the computer readable storage area. A signal provider used to trigger events (times or actual events) is also coupled to the bandwidth labeler. In this configuration, the bandwidth labeler receives a signal provided from the signal provider and monitors the bandwidth allocation information in the resource allocation table for an occurrence of the signal, and upon such occurrence, the bandwidth labeler modifies the amount of bandwidth allocated to the session of data communications in the data transporter.

The signal provider may be a clock providing a time signal or an event signal providing an event signal upon the occurrence of an event. The time signal and the event signal are determined by the bandwidth labeler to match the future event determined by the bandwidth reservation processor. That is, a time provided by the clock or an event provided such as an event (e.g., interrupt) signal can be compared to information in the resource allocation table. When there is a match, the bandwidth is modified, as specified for the particular data type of the session of data communications.

Generally, the bandwidth reservation processor receives the bandwidth allocation information and controls, over a period of time, an amount of bandwidth reserved within the data transporter for transferring data associated with the session of data communication through the data communications device. As noted above, in one configuration, the bandwidth reservation processor controls the amount of bandwidth reserved based on a time schedule determined from the future bandwidth allocation modification information.

The bandwidth reservation processor can detect future times and events specified by just a single bandwidth reservation message. Upon the occurrence of the events or times, the bandwidth reservation processor modifies the amount of bandwidth reserved for a session of data communications without additional bandwidth reservation messages. This saves network bandwidth since only one resource reservation message is needed to instruct a data communications device how to modify bandwidth at future times or in the event of future events.

The invention also provides a computer program product having a computer-readable medium including computer program logic encoded thereon for allocating bandwidth in a data communications device. Generally, when the computer program logic is executed on at least one processing unit with the data communications device (e.g., within the bandwidth reservation processor) the computer program logic can cause the processor to perform one or more of the aforementioned methods of the invention. This embodiment is thus directed to a disk, memory, or other computer readable medium that is encoded with computer code (i.e., software) that includes logic to carry out the methods of the invention. These embodiments need not be resident in a computer system or data communications device. Rather, they may simply exist as software or as a program on some sort of computer readable medium, such as a CD-ROM or hard or floppy disk.

Other embodiments of the invention include an apparatus transmitting a portion of data in a data communications network. This embodiment is generally directed to a data communications device that creates, formats, and then transmits an RSVP message as modified according to the invention as explained herein. The portion of data (i.e., the RSVP message) is formatted as, and comprises, an RSVP reservation request message indicating an amount of bandwidth to be reserved for a session of data communication, and a future time at which to modify the amount of bandwidth reserved for the session of data communication, and an amount by which to modify the amount of bandwidth reserved for the session of data communication upon occurrence of the future time.

Also provided in another embodiment is a data communications device configured with a data structure. The data structure includes an identification of a session of data communication and future bandwidth allocation modification information allowing a data communications device to determine a future event, the occurrence of which causes the data communications device to modify an amount of bandwidth allocated to the session of data communications and an indication of how much to modify the amount of bandwidth reserved for the session of data communication. A data structure configured in this manner may preferably be embodied as an RSVP bandwidth reservation message within a data communications device (i.e., in a memory of a device driver or other processor or on a disk) and can include the identification of a session of data communication and the future bandwidth allocation modification information for that session.

The aforementioned embodiments provide mechanisms offering time or event-based resource allocation for data in packets, cells, frames, or other formats that are transferred on a data communications network. In particular, preferred embodiments of the invention provide the aforementioned augmentations to the RSVP protocol which include the additional time and/or event information (future bandwidth modification information) and the ability of a data communications device to accept this information as either the RSVP message or as a network policy or template and provide timed updates to the reservation of bandwidth and/or other resources such as memory and processor cycles in a data communications device.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 5 illustrates a data structure embodying an example of a network policy resource allocation table, maintained in a data communications device of this invention, and configured with bandwidths to be allocated to specific types of data at specific times or upon occurrence of specific event that occur within a twenty-four hour period.

DETAILED DESCRIPTION OF PREFERRED EMBODIMENTS

Figure 1:
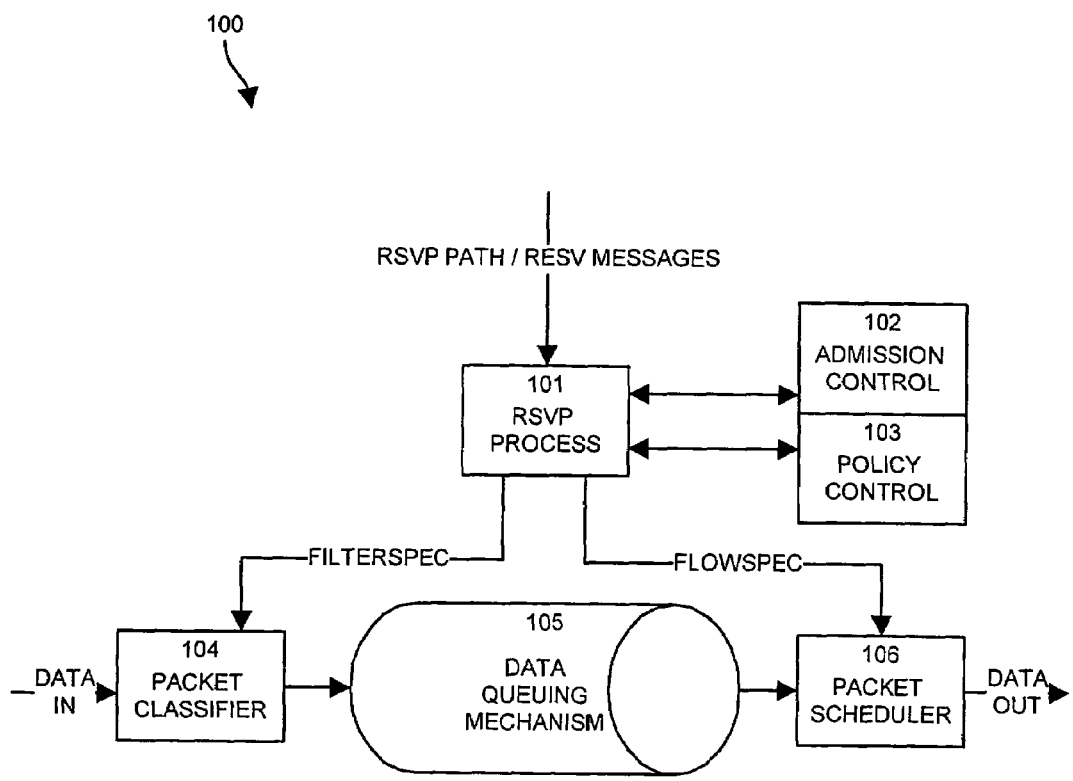
FIG. 1 illustrates a typical prior art implementation of the RSVP protocol used to reserve bandwidth within a data communications device.

As discussed above, the present invention is generally directed to mechanisms which allow data communications devices that form a communications network, such as routers, hubs, gateways, switches, and so forth, to be configured with bandwidth allocation information that establishes reserved or allocated amounts of bandwidth that can be automatically and dynamically changed over time. By dynamic, what is meant is that a data communications device that is currently transferring data associated with a session of data communications need not break the session in order to adjust or modify bandwidth. The bandwidth allocation information itself specifies amounts of bandwidth that are to be reserved, for example, for specific sessions of data that pass through the device(s) forming the network. The bandwidth allocation information can also specify future bandwidth allocation modification information which defines specific times (or events), the occurrence of which cause the amount of reserved bandwidth in the device(s) in the network to be automatically changed or adjusted. Preferably, the bandwidth allocation information, including the future bandwidth allocation modification information, exists in the form of extension(s) to a bandwidth reservation protocol, such as the Reservation Protocol (RSVP).

Generally, the data communications devices of this invention are equipped with a bandwidth management mechanism that can determine, based on the bandwidth allocation information, the future events (e.g., times of the day or night, signals, changes in network topology, or other occurrences) that are to cause the amounts of reserved bandwidth to be automatically changed or adjusted. The bandwidth management mechanism in each device can then detect the occurrence of the future event(s) and can modify the amount of bandwidth allocated to the sessions of data in response. Embodiments of the invention allow the amount of reserved bandwidth to be adjusted/modified in a data communications device without having to break to session of data communication in the data communications device. Generally, the invention thus provides a mechanism to allow a data communications device to make bandwidth allocation adjustments automatically, without requiring additional bandwidth reservation messages for each required change in bandwidth. Extending this concept, the invention allows data communications devices to implement and accommodate network business cycles (i.e., changing network requirements) or policies, allowing the network as a whole to automatically provide reserved bandwidth requirements to business or other data communication users based on pre-determined events that may occur randomly or at predetermined times or business cycles within the network infrastructure. For example, if certain times of the day require certain bandwidths to be reserved in a recurring pattern or sequence, the invention allows a data communications device to be configured once with this information and the device can then automatically reserve the appropriate amounts of bandwidth at those times of the day, thus allowing the network to automatically be adapted to the needs of a business cycle.

Figure 3:
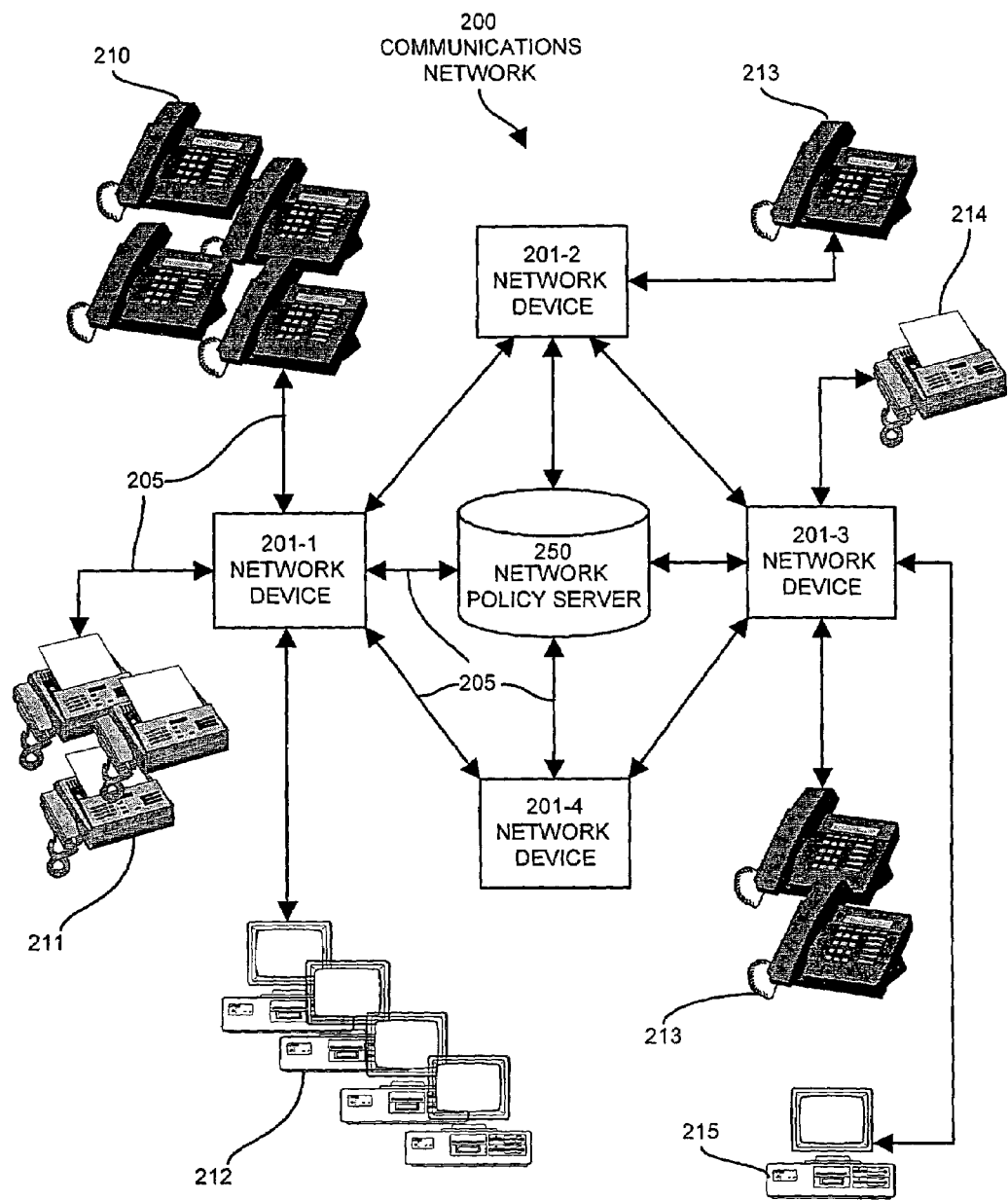
FIG. 3 illustrates a data communications networking environment using data communications devices configured to reserve bandwidth according to the invention.

FIG. 3 illustrates an example of a communications network 200 configured to take advantage of the techniques provided by the invention. The network 200 generally includes data links (e.g., 205) which interconnect a plurality of networked devices including data communications devices 201-1 through 201-4 (collectively 201), a network policy server 250, voice terminals 210, 213, facsimile terminals 211, 214, and computer terminals (hosts) 212, 215.

The data communications devices 201 form the general network infrastructure and provide processing resources (routing and/or switching algorithms, protocol handlers, queues, buffers, switching fabrics, data busses, backplanes, processors, input and output ports, and so forth) to propagate many types of data through the network 200 between the hosts 212, 215, facsimile terminals 211, 214 and voice terminals 210, 213. The data communication devices 201 may be any type of data processing device that can transfer, switch, route or otherwise direct or propagate data in the network 200. Possible examples of data communications devices 201 in this invention are network access servers, routers, switches, hubs, bridges, gateways, proxy servers, firewalls, modem banks, concentrators, repeaters, PBX's and/or similar data transfer devices, or any combination thereof. Certain embodiments of this invention are implemented within the data communications devices 201 and allow each device 201 to dynamically reserve bandwidth to one or more sessions of data communication between terminals 210 through 215 and allow the amount of bandwidth that is reserved by or to those sessions to be automatically and dynamically changed upon the occurrence of a time or event, as will be explained in more detail.

The data links (e.g., 205) which interconnect the various data communications devices and terminals 210 through 215 allow many different types of data to be transmitted within network 200. The data links (205) can be any type of communication medium including physical network cables, wires, fiber optic links, or any type of wireless transmission links or another communications medium. It is to be understood that while the example network 200 is illustrated as a relatively small network for ease of description of the invention, the invention is equally applicable to networks of all sizes and types, including interconnected local area networks (LANs), wide area networks (WANs), intranets, extranets, and conglomerations of many networks, such as the Internet, for example.

As illustrated, the network infrastructure (data links 205 and interconnected data communications devices 201) of example network 200 can transmit or "carry" voice, facsimile and computer data traffic to and/or from the voice, facsimile and computer terminals 210 through 215. For example, voice terminals (e.g., digital telephones) 210 may communicate across the network 200 with other voice terminals 213, or with voice driven software applications executing on one or more of the computer terminals 212, 215. Voice terminals 210 and 213 generally transmit voice data (not specifically shown) which has real-time transmission requirements within the network 200, due to the real-time nature of voice communications. Likewise, facsimile terminals 211 may send and receive facsimile (or voice) data to and/or from facsimile terminal 214, or to and/or from fax software applications executing on any of the computer terminals 212, 215. Similarly, the network 200 can allow computer terminals 212, 215 to exchange computer data (e.g. modem data, or data transmitted via different applications protocols) amongst each other, or between voice or facsimile terminals 210, 213, 211, 214. The computer terminals 212, 215 may be any type of computing devices such as personal computers, workstations, file servers, dedicated web-site browsers or servers, network-telephony devices, audio or video servers, and so forth.

FIG. 3 is useful for illustrating techniques provided by the invention. An explanation of the high level operation of the invention will be helpful in understanding more detailed aspects of the embodiments of the invention presented later.

In FIG. 3, suppose, for example, that network 200 is a leased network coupling various remotely located divisions of a business. For instance, the voice terminals 210 may be used primarily by a sales department, while voice terminals 213 may be used by various corporate offices maintained by the business. The facsimile terminals 211 and 214 may be dedicated to the human resource and ordering departments, respectively, while the computer terminals 212 may be used by the engineering department. Computer terminal 215 may be located in a remote facility and may serve as a data backup server which performs automated nightly backups of data stored on the computer terminals 212.

Figure 4A:
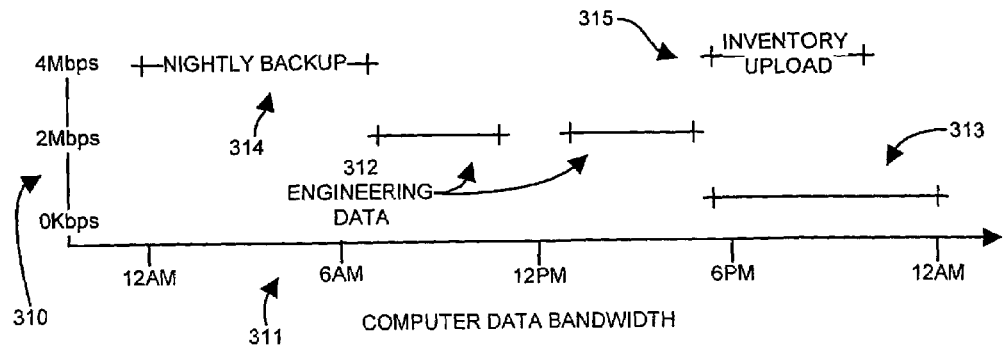
FIG. 4A illustrates an example network use pattern for computer data in a business cycle.
Figure 4B:
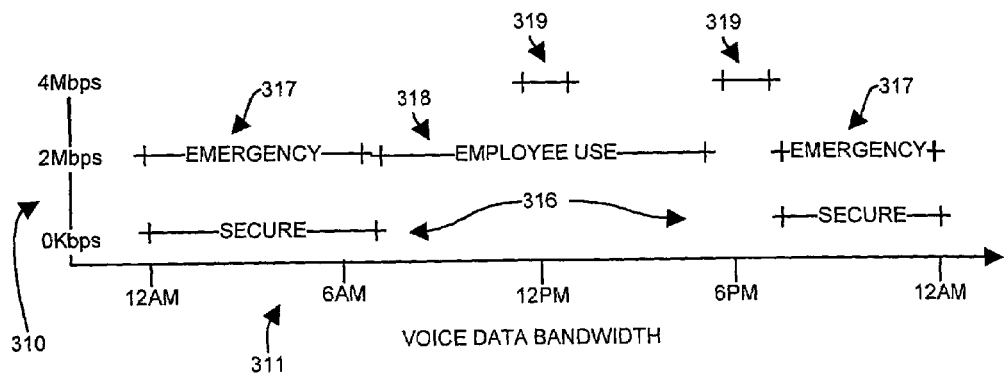
FIG. 4B illustrates an example network use pattern for voice data in a business cycle.
Figure 4C:
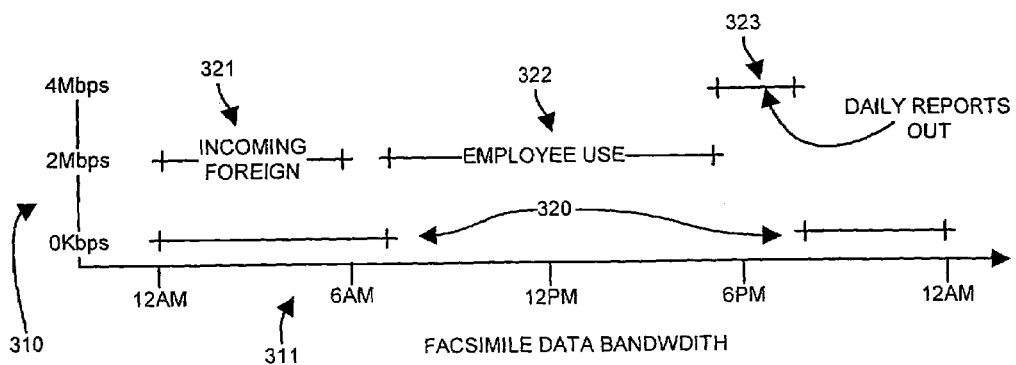
FIG. 4C illustrates an example network use pattern for facsimile data in a business cycle.

During a typical twenty-four hour period in a normal business day (e.g., Monday through Friday), the various voice, facsimile and computer terminals 210 through 215 within the business network 200 each require varying amounts of network resources at various times of the day to handle the transfer of data. This is illustrated in FIGS. 4A through 4C, which indicate various bandwidth requirements for computer data, voice data and facsimile data, respectively, during a twenty-four hour period of a typical business workday, for the voice, facsimile, and computer terminals coupled to network 200. Bandwidth requirements may also vary with weekly, monthly and yearly requirements, or may have predetermined patterns such as high requirements during a work week (Monday-Friday) and low requirements during evenings or weekends.

More specifically, FIG. 4A illustrates the bandwidth requirements for computer data transmitted on network 200 during a twenty-four hour period in a typical workday. The graph (bandwidth axis 310, time axis 311) essentially defines a business cycle specifying bandwidth requirements for the transmission of computer data on the network 200. As shown at 314, from 12 A.M. to 7 A.M. the network 200 must allocate or reserve four megabits per second (4 Mbps) of bandwidth for the transmission of computer data. This reserved period of high bandwidth 314 is required in this example to allow the backup computer terminal 215 to complete its high-speed nightly backup of data from each of the computer hosts 212. Then, between 7 A.M. and 11:30 A.M., and 12:30 P.M. and 5 P.M. (i.e., during normal working hours) 2 Mbps of bandwidth is required to be reserved for the transmission of computer data 312 (engineering data in this example). The 2 Mbps of bandwidth 312 provides a minimum bandwidth or guaranteed Quality of Service (QoS) that is used for the transmission of computer data within data communications devices 201 during the work day. During the evenings between 5:30 P.M. and 12 A.M., data communications devices 201 do not need to reserve any pre-set amount of bandwidth for the transmission of computer data, as shown at 313, and thus a best-effort-only Quality of Service is provided by the data communications devices 201 when transmitting computer data at this time. The time periods 312 through 314 define times and corresponding specific amounts of bandwidth that are required for computer data on network 200.

Segment 315 in FIG. 4A provides an example of an event that may require a data communications device 201 to reserve a certain amount of bandwidth for the transmission of computer data on network 200. More specifically, segment 315, labeled "INVENTORY UPLOAD", specifies that when a computer terminal (e.g. one of computer terminals 212, 215) is performing the operation (i.e., the event) of uploading inventory data, which requires a large amount of network bandwidth, the data communications devices 201 that transfer this data are to provide 4 Mbps of bandwidth. However, if during the period of time between 5:30 P.M. and 12 A.M., no inventory upload is taking place with respect to a computer terminal 212 or 215, then the 4 Mbps of bandwidth is not to be reserved.

FIG. 4B illustrates the bandwidth requirements for voice data on network 200. From the early evening into the early morning hours, from 7 P.M. to 7 A.M. (i.e., during non-working hours), the bandwidth requirements 316 for voice data on the network 200 are minimal and thus no bandwidth needs to be reserved for voice data. However, in the event 317 that an emergency occurs in which the business must remain open during these hours (a specific event, as compared to a routine time), voice terminals 210 may require 2 Mbps of reserved bandwidth in the network 200 for voice data traffic. During normal hours of business operation, from 7 A.M. to 5 P.M., voice terminals 210 also require 2 Mbps of reserved bandwidth 318 within network 200. Further note that during peak periods 319 when sales calls are made at lunch time (11:30 to 12:30 P.M.) and dinner time (5:30 P.M. to 7 P.M.), the network 200 must provide as much as 4 Mbps of bandwidth to accommodate heavy voice data traffic from voice terminals 212 and/or 213.

FIG. 4C illustrates facsimile data bandwidth requirements for network 200. As illustrated at 320, facsimile data generally requires no reserved bandwidth between the hours of 7 P.M. and 7 A.M., since few fax transmissions typically occur during non-working hours. However, in this example, foreign associates of the business may periodically transmit large faxes to the company as illustrated by the "INCOMING FOREIGN" event 321. If event 321 occurs, the data communications devices 201 are required to provide 2 Mbps of bandwidth during the event of the incoming facsimile transmissions to facsimile terminals 211 and/or 214. During the normal working hours of 7 A.M. to 5 P.M., 2 Mbps of bandwidth is required for facsimile data generated from employee use of facsimile terminals 211 and/or 214. However, during the hours of 5 P.M. to 7 P.M., daily reports must be sent via facsimile to suppliers of the business which requires heavy use of the network and thus the network 200 must supply 4 Mbps of bandwidth at the time indicated at 323.

FIG. 5 illustrates a network policy resource allocation table 400 that more formally represents the bandwidth requirements described with respect to FIGS. 4A through 4C for the computer, voice and facsimile data types. In Column 1 "DATA TYPE" in FIG. 5, each of the three data types: COMPUTER DATA, VOICE DATA, and FACSIMILE DATA are listed. In Column 2, labeled "MODIFICATION INFORMATION," the various times or events are listed for each data type that when, upon the occurrence of the time or event, will cause a data communications device 201 in network 200 to set the amount of reserved bandwidth as specified in Column 3, labeled "RESERVED BANDWIDTH." In other words, the resource allocation table 400 is a data structure that can be represented within a data communications device 201 and can indicate to the data communications device 201 what the prescribed reserved amounts of bandwidth are for listed (in the table) data types during the listed times of the day or upon the occurrence of the listed events in the table 400.

Figure 2:
FIG. 2 illustrates an example structure of a prior art packet used to reserve bandwidth for a particular stream of data according to the RSVP protocol.

According to one embodiment of this invention, the network policy server 250 in network 200 (FIG. 2) maintains and distributes the network policy resource allocation table 400 to each data communications device 201 on a periodic basis. In an alternative embodiment, as will be explained further, each data communications device 201 maintains the table 400 based on individual bandwidth reservation requests (e.g., extended RSVP requests as will be explained when they are received by the data communications devices 201).

Figure 6:
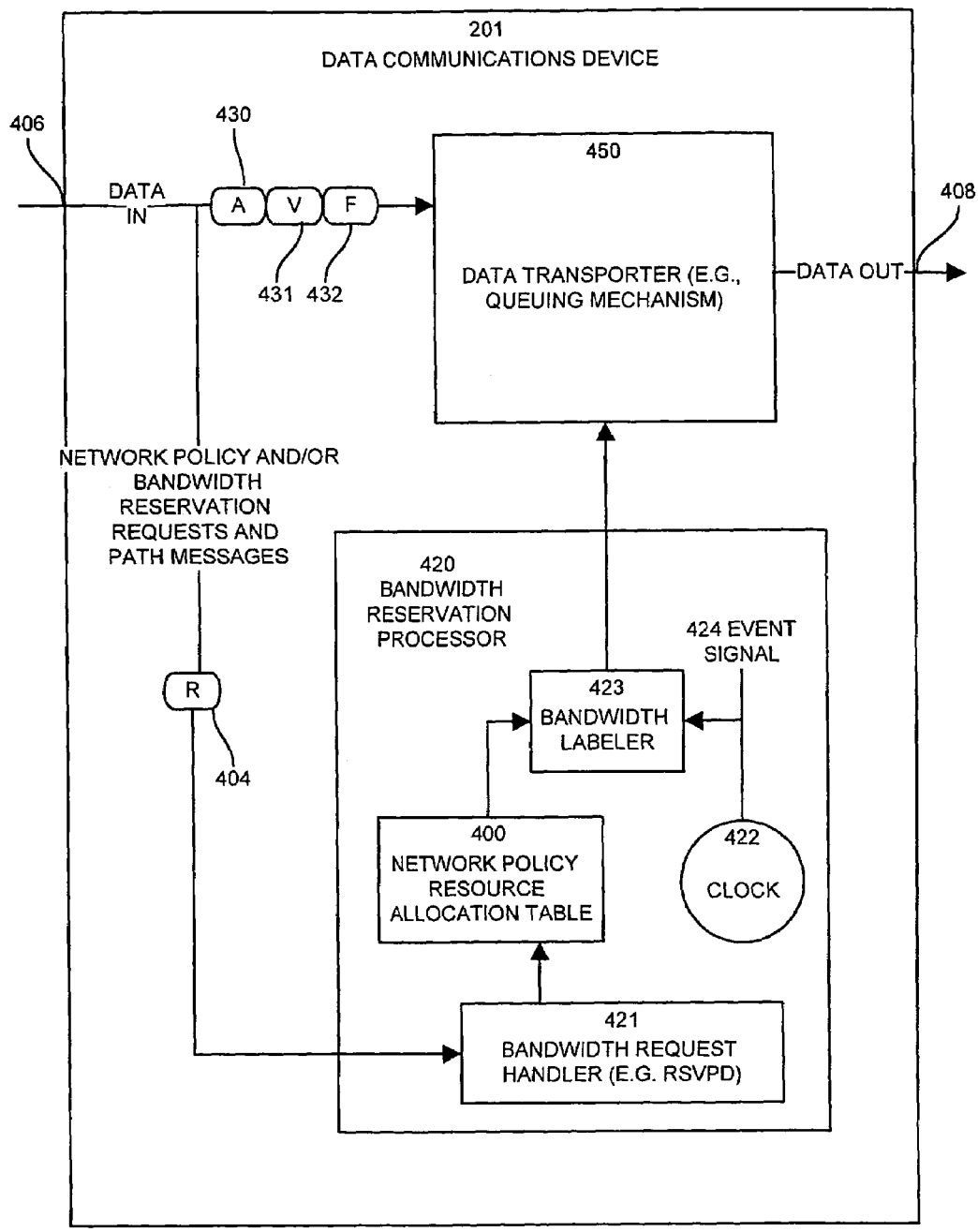
FIG. 6 illustrates an example architecture of a data communications device configured with the bandwidth allocation mechanisms of this invention.

FIG. 6 illustrates a more detailed architecture of a data communications device 201 configured according to an embodiment of the invention which provides the processing capabilities outlined above. In the illustrated embodiment, the data communications device 201 contains an inter-coupling of at least one input port 406, a data transporter 450, a bandwidth reservation processor 420 including a bandwidth request handler 421, a bandwidth labeler 423, a clock 422, and the network policy resource allocation table 400, and at least one output port 408.

According to the general operation of the data communications device 201, the input port 406 receives, in no particular order, packets of application data such as 430, 431 and 432, which in this example respectively correspond to computer, voice and facsimile data. Data packets 430 through 432 (computer, voice and facsimile data packets) are generally referred to as application data since this data is generated by the computer, voice and facsimile terminals 212, 210 through 215 (FIG. 3). Voice, facsimile and computer terminals 210 through 215 can transmit many series of these data packets 430 through 432 as sessions of data communications (i.e. many each of packets 430, 431, 432) across the network 200 (FIG. 3). For example, the transmission of many voice data packets 431 occurs during a conversation between two voice terminals 210 and 213, for example, and creates a flow, stream or session of voice data communications.

When the data communications device 201 receives application data at an input port (e.g., 406), the data communications device 201 directs the application data (packets 430 through 432) to the data transporter 450. The function of the data transporter 450 is generally to temporarily store or buffer application data (e.g., 430 through 432) until the data may be properly routed or directed out of the data communications device 201 through an appropriate output port (e.g. 408). The selection of an output port 408 depends upon the destination of the packet 430, 431 or 432 within the network 200, as specified in a packet header (not shown in this figure).

Each stream or session of data communication (e.g., series of voice packets 431, computer data packets 430, or facsimile packets 432) that is transported through the data transporter 450 requires a certain amount of bandwidth. Bandwidth in this sense is generally an amount of resources such as queuing, buffer or memory space and associated processing power required to receive and transfer the session of data from an input port 406, through the data transporter 450, and out of an output port 408. The data transporter 450, which is generally responsible for determining the destination (e.g., which output port 408 to send data to) for each data packet 430 through 432 may only have a limited amount of bandwidth with which to transfer packets for all sessions of data communication. As such, the aforementioned bandwidth reservation techniques, which will be explained in more detail below, provide a mechanism to reserve or guarantee a particular amount of bandwidth for a session of data communications within the data communications device 200 during specific times or upon the occurrence of specific events.

The preferred design and operation of a data transporter 450 suitable for use in a data communications device 201 for the present invention is discussed in detail in the formerly incorporated by reference co-pending U.S. patent application Ser. No. 09/317,381, entitled "Apparatus and Methods for Dynamic Bandwidth Allocation". The reader is directed to the contents of this application for a detailed discussion of a data transporter suitable for use by the present invention. The referenced application also provides an example of a bandwidth allocation mechanism suitable for use by the present invention which allows bandwidth adjustments to be made without disrupting a session of data communications.

In operation of a data communications device 201 configured according to the present invention, bandwidth reservations may be configured before any sessions of data communication have begun to be transmitted. The invention however is equally applicable to situations where a session of data communication is already established (i.e., data transport is underway across the network through data communications devices 201) but where there is no particular amount of bandwidth pre-allocated or reserved for that session in the data communications devices 201 which transport the data. That is, the invention can be used to establish or change a bandwidth reservation concurrently with an active session of data communication that is already being transported through a network. Using the bandwidth allocation and modification techniques explained herein, in conjunction with the dynamic bandwidth adjustment techniques taught in the aforementioned patent application Ser. No. 09/317,381, bandwidth may be reserved, adjusted and/or modified at a later (i.e., future) time without having to disrupt or interrupt the session transmission in any way. In a similar manner, the invention can also be used to adjust or modify a bandwidth reservation already assigned to a data communication session that is underway and that is currently being used to transport data through a network. The adjustments or modifications to amounts of reserved bandwidth can be specified to occur at a future time or event, and when they occur as provided by the invention, there is no need to disrupt the session of data communication, if a session is currently underway.

According to embodiments of this invention, in order to reserve bandwidth for a session(s) of data communication in any of these situations (i.e., for currently active sessions or for future reservations of future sessions), the data communications device 201 receives bandwidth allocation information 404. Bandwidth allocation information 404 can exist in many forms. For example, according to a preferred embodiment of the invention, RSVP reservation request and path messages can be used to specify bandwidth reservations for sessions of data communication. In this instance, conventional RSVP messages may be used for this purpose. Alternatively, the invention specifies an extension to the RSVP protocol (explained below) which allows an RSVP reservation message to specify future bandwidth allocation modification information, such as a future time or event, upon which the bandwidth reservation will either be created or modified as needed in the data communications device 201. In yet another alternative embodiment, bandwidth allocation information can be specified as a network policy or template, such as that provided in the example network policy resource allocation table 400 in FIG. 5.

In any event, as illustrated in FIG. 6, the bandwidth allocation information 404 is detected by the data communications device 201 and is directed to the bandwidth request handler 421 within the bandwidth reservation processor 420. The bandwidth request handler 421 is a software process or a hardware processing element that executes a version of a reservation protocol defined by this invention within the data communications device 201. If the data communications device 201 receives the bandwidth allocation information in the form of one or more RSVP path and reservation messages, the bandwidth request handler 421 is generally responsible for accepting or denying the bandwidth reservation requests 404. If accepted, the bandwidth request handler 421 enters information from the requests 404 into the network policy resource allocation table 400 (or updates it if it already exists), as will be explained. If however, the data communications device 201 receives the bandwidth allocation information 404 in the form of a network policy, then the network policy resource allocation table 400 is generally received as it appears in FIG. 5 and is stored, for example, in a cache memory within the bandwidth reservation processor 420.

As discussed above, the network policy resource allocation table 400 generally indicates the bandwidths to be reserved for various data types at various times or upon occurrences of various events. Though not the direct subject of this invention, the bandwidth request handler 421 can also use the bandwidth allocation information 404 to produce sender state data which is not shown in the figures related to this invention. However, sender state data, which specifies the source and destination ports for data of a particular session or sessions of data communication, along with its use and relation to the RSVP protocol, is discussed in detail in the formerly referenced co-pending patent application having Ser. No. 09/317,381.

Once the network policy resource allocation table 400 is established in the bandwidth reservation processor 420, the bandwidth labeler 423 can interpret the information in the table 400 and can appropriately reserve, modify, and unreserve bandwidth resources (i.e., queue space, processor resources, as so forth) within the data transporter 450 at the appropriate time or on the occurrence of one or more events. To determine the time or event causing a modification to made to a reserved amount of bandwidth, in preferred embodiments, the bandwidth labeler is coupled to a clock 422 and/or to an event signal 424. The clock 422 and the event signal 424 provide a time signal or event signal to indicate to the bandwidth labeler 423 when future events (times or actual signals indicating an event) occur. Using the information provided by the clock 422 and the event signal 424, and the MODIFICATION INFORMATION from Column 2 of the table 400 (FIG. 5), the bandwidth labeler 423 can correctly determine when to reserve the amounts of bandwidth specified in Column 3 RESERVED BANDWIDTHS of table 400. For more complete details of a preferred general operation of the bandwidth labeler 423 with respect to actually allocating bandwidth within the data transporter 450, the reader is referred to the discussion related thereto in the formerly referenced co-pending patent application having Ser. No. 09/317,381.

As noted above, one mechanism by which the bandwidth allocation information 404 can be specified is via an extension to the RSVP protocol. In such an embodiment, conventional RSVP protocol messages are provided with future bandwidth modification information in the form of a time or event definition. More specifically, the RSVP bandwidth reservation messages (examples provided below) identify a session of data communication, an amount of bandwidth to reserve in the data communications device 201 for the session of data communication, and include bandwidth allocation modification information including future bandwidth allocation modification information. The future bandwidth allocation modification information specifies a predetermined event (event being the definition of an event signal or time in the bandwidth allocation information) and a bandwidth modification amount indicating an amount by which the amount of bandwidth allocated to the session of data communications should be modified in the data communications device 201 when the future event is detected (i.e., upon the occurrence of the event signal or time).

Data communications devices 201 using RSVP typically have an RSVP process or daemon, which is generally equivalent to the bandwidth request handler 421 in FIG. 6. However, according to this invention, the RSVP process executing in the bandwidth request handler 421 is able to interpret additional event or time information specified in the extended RSVP messages (or a network policy) (explained below) and is able to enter this modification information into the network policy resource allocation table 400, as illustrated in Column 2 of table 400 in FIG. 5.

An example format of an extended RSVP bandwidth reservation message provided according to this invention is as follows:

EXAMPLE 1

Time Driven RSVP Command with Modification Information

<TIME1><SESSION-ID>ON<RSVP TSPEC1>"MODIFY"<TIME2><SESSION-ID>ON<RSVP TSPEC2>

Such an extended RSVP command specifies to a network device 201 (i.e., to the bandwidth reservation processor 420) that at a time "TIME1" (as determined by clock 422), a session of data communication having session identification "SESSION-ID" is to have a bandwidth allocation configured according to RSVP TSPEC1, which specifies a data type, the path and an actual amount of bandwidth to be reserved. The remainder portion of the RSVP example message shown above further specifies that the reservation should be modified upon the future occurrence of the event TIME2 (i.e., a time of day or offset from the current time), and the RSVP TSPEC2 parameters should be used to properly configure (i.e., modify or adjust) the bandwidth reservation at that time TIME2. This command can also specify multiple time modifications, other than the single time-based modification shown in the example. When a data communications device 201 receives such a command in the form of the bandwidth allocation information 404 (FIG. 6), the future bandwidth allocation modification information specified by <TIME2><SESSION-ID>ON<RSVP TSPEC2> allows a data communications device 201 to modify the identified bandwidths at the identified future times. In this example, the future bandwidth modification information may specify a predetermined event as a measure of time (e.g., an offset from current time), or it may indicate the absolute time at which the modification is to occur. Alternatively, a value can be specified which the data communications device uses to compute a future time. The value might be used by a bandwidth predication algorithm, for example, in order to compute a time at which to adjust bandwidth reserved for a stream of data based on a predicted time when the stream will need more or less bandwidth, as computed by a bandwidth prediction algorithm using the value specified in the command.

Alternatively, the future bandwidth modification information provided by this invention in an extended RSVP message can specify one or more events (i.e., a cycle of various bandwidth modifications to make upon occurrence of each event (time or event signal)) thus defining a business cycle that is detectable by the data communications device 201. In such an instance, various event signals 424 indicate the existence of various events to the bandwidth labeler 423 as each event occurs. In response to each event, the bandwidth labeler 423 consults the network policy resource allocation table 400 to determine how to adjust the bandwidth accordingly for each event. Two examples of RSVP commands containing event driven future bandwidth modification information are as follows:

EXAMPLE 2

Event Driven Bandwidth Reservation Command

<TIME1><SESSION-ID>ON<RSVP TSPEC1>"MODIFY"<EVENT1><SESSION-ID>ON<RSVP TSPEC2> and

EXAMPLE 3

Event Driven Bandwidth Reservation Command

<EVENT1><SESSION-ID>ON<RSVP TSPEC1>"MODIFY"<EVENT2><SESSION-ID>ON<RSVP TSPEC2>.

In either of the above examples of event driven modification, the RSVP command specifies an event EVENT1 or EVENT2, upon the occurrence of which the bandwidth reservation processor 420 properly reserves or modifies the amount of reserved bandwidth for one or more sessions of data communications. In the case of example two, the initial reservation is established at TIME1, and is modified upon the occurrence of EVENT1. In example three, the reserved data communications device resources (e.g., bandwidth) are initially reserved upon the occurrence of EVENT1, and are then modified upon the occurrence of EVENT2. It is to be understood that various combinations of times and/or events incorporated into any type of RSVP or other resource reservation operation within data communications devices is contemplated as being within the scope of this invention.

It is important to understand that a single command can be used to establish the reserved bandwidth and also may specify modifications to be made to the bandwidth at future events, as well as to merely re-program a data communications device 201 that already has a network policy resource allocation table 400 configured. In the later case, the network policy resource allocation table 400 may be initially created via distribution of an entire network policy from the network policy server 250 (e.g., specifying most or all of the data in table 400 in FIG. 5). For example, perhaps a single initial network policy specifies an initial configuration of reserved bandwidths with an initial set of modification times, and a subsequent RSVP message indicates a change to the modification times of the initial configuration. Such an embodiment might be useful, for example, to program a data communications device for bandwidth reservations for times of the day (or night) that occur Monday through Friday (i.e., during the business week), and then, Friday evening, an RSVP message containing weekend bandwidth modification times may be used to reconfigure the data communications devices in a network to reserve less resources. If a corporation pays money to a network service provider based on amounts of bandwidth that are to be reserved, such an embodiment of the invention may be used to optimally configure data communications devices to automatically adjust bandwidths only as needed, thus saving the corporation money during times when the bandwidth is not required. Since the embodiments of the invention automate the process of device reconfiguration at future time(s), systems administrator time (and money) is also saved since each reconfiguration does not require human interaction.

In an alternative embodiment, the table 400 may be created over time as more and more RSVP messages, such as those in the above examples, are received by a data communications device 201. However, once the table 400 is established, the individual RSVP messages, such as those in the example above, can also be used to modify the modification information in Column 2 of the table 400 without specifying a new current reservation. To do so, such a command simply does not change reservation information for a current data type (i.e., the first part of the command specifying an initial time or event and a reservation). Rather, the command can simply specify new modification information (i.e., the remainder of the commands after the "modify" portion) which will cause the bandwidth request handler 421 to update the table 400 with the new future bandwidth modification information, but will not alter the current reservation that is being used at that moment to transfer data.

In this manner, the invention offers the ability to program a data communications device 201 for future operation via one or more bandwidth allocation messages. Once programmed, the future scheduled changes in bandwidth (i.e., the program as specified by the modification schedule in table 400) can be updated as needed.

As explained above, the bandwidth reservation processor 420 in each data communications device 201 (in the example network 200 in FIG. 3) interprets the information in the network policy resource allocation table 400 in order to automatically and dynamically adjust bandwidths for the specified sessions of data communication. In other words, when a data communications device 201 in the example network 200 has access to the information in table 400, it can adjust bandwidth for the computer, voice and facsimile data types according to the times or events specified in the table 400. In this manner, once a data communications device 201 is configured with the table 400, there may be no further need to use additional bandwidth reservation requests in order to dynamically adjust or modify bandwidth reservation over a period of time, as the modification or adjustment information is already specified in the table 400 from the network policy or initial requests.

Figure 7:
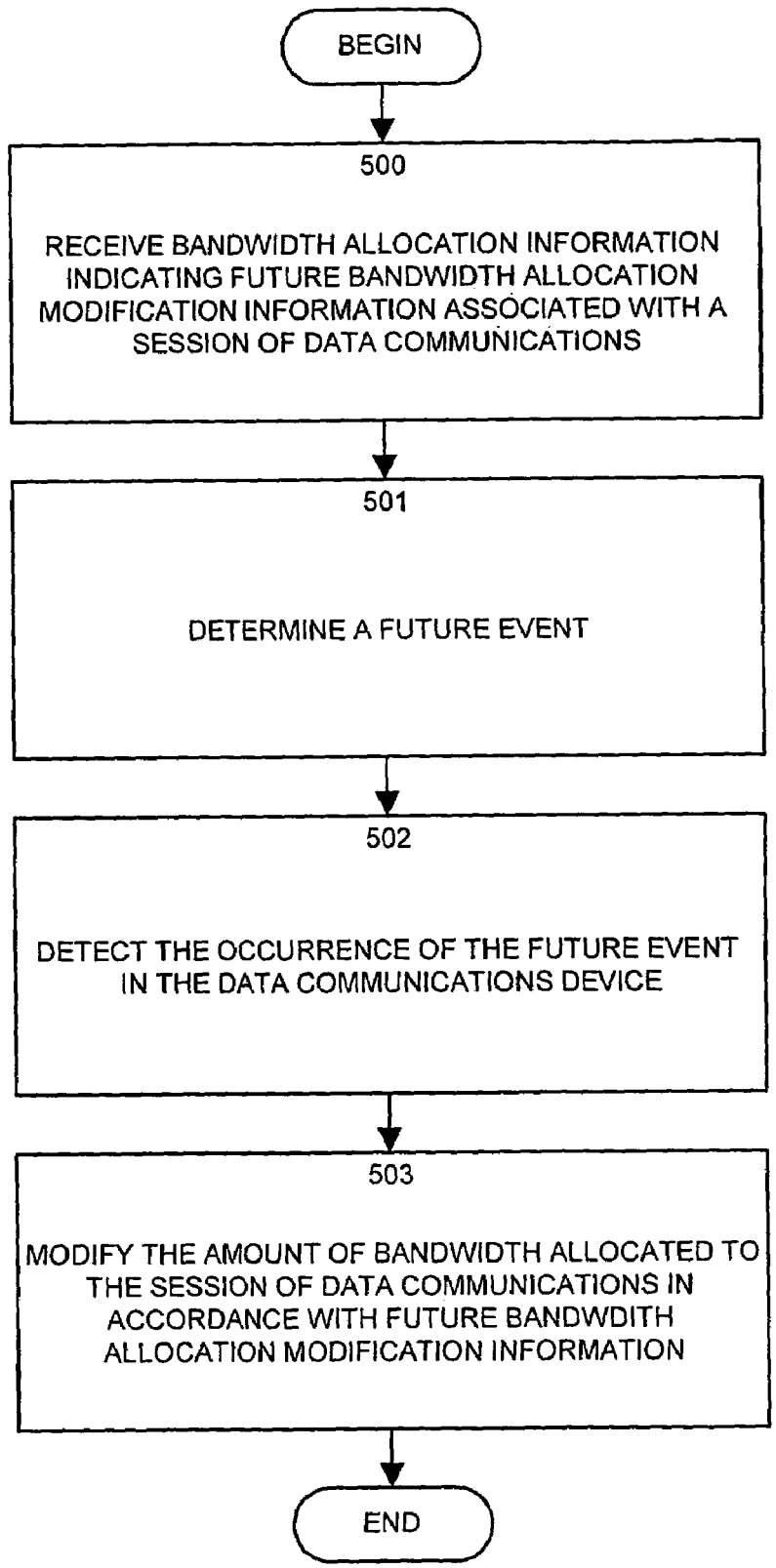
FIG. 7 is a flow chart illustrating example processing steps performed to configure a device according to the invention.

FIG. 7 shows the steps 500 through 503 performed by a data communications device 201 configured to operate according to the invention. In step 500, the data communications device 201 receives bandwidth allocation information indicating future bandwidth allocation modification information associated with a session of data communication. As discussed above, the bandwidth allocation information can be a network policy (i.e., complete set of information as shown in Table 400) or RSVP messages having the extended time or event modification information. Next, in step 501, the data communications device 201 determines a future event upon the occurrence of which the data communications device will modify an amount of bandwidth allocated to the session of data communication. In the former example, the step of determining a future event is performed by the bandwidth reservation processor 420 by the creation of the network policy resource allocation table 400. That is, the future events are specified as Column2 and are determined based upon the future bandwidth allocation modification information indicating the various times or events that cause bandwidth modifications.

In step 502, the data communications device 201 detects the occurrence of the future event. With respect to the aforementioned examples, through the use of the clock and event signals 422 and 424, the bandwidth reservation processor 420 is able to detect the times and/or events specified in the table 400 as they occur. Finally, in response to the detecting step 502, the data communications device 201 modifies the amount of bandwidth allocated to the session of data communications within the data transporter 450. Step 502 is performed with respect to the former examples by the bandwidth labeler 423 which re-proportions reserved resources in the data transporter 450 at the specified time or upon the specified event. The processing steps of the system and methods of the invention may be implemented in hardware, software, firmware, or a combination thereof within a data communications device.

From the foregoing description, it is to be understood that the invention discloses extensions to the RSVP protocol. While specific example embodiments have been discussed, it is to be understood by those skilled in the art that variations to these embodiments are contemplated as being within the scope of this invention. For example, in one variation, the RSVP extensions can be maintained in RSVP state information table(s) such as the resource allocation table 400. By setting the time (or event) values in such tables, the bandwidth reservation processor 420 (FIG. 6) can keep track of, for instance, a series of timers that are set when the table 400 is created. When timers expire, the bandwidth reservations are changed for the associated data types as specified in the table 400.

The invention generally alleviates the problems of how to flexibly and efficiently meet the need for predetermined modifications of network resources for data traffic flows and session of data communications at different times of the day or in response to different network events. Since the bandwidth or other resource characteristics can change dynamically and automatically, without continuous adjustments via RSVP reserve and un-reserve messages (as required in prior art systems), the data communications device 201 in a network (e.g., 200) can better meet business cycle need. This simplifies a network administrators job as well, since automation of bandwidth reservation is accomplished. Traffic flows or sessions of data communications need not be torn down or halted since bandwidth modifications can be performed as explained herein and the data communications device can use a dynamic bandwidth allocation scheme as described in the formerly referenced patent application having Ser. No. 09/317,381. This former application discusses mechanisms which allow continuous data transfer during bandwidth adjustments. Thus, embodiments of the present invention specify how a device can be configured to automatically adjust bandwidths at future times (or upon future events) for future bandwidth requirements or needs, while the system of the referenced application (Ser. No. 09/317,381) specifies how those adjustments can be made within a data communications device (once the future times or events occur) without having to cause the session of data communications to be halted or interrupted.

While the example network 200 illustrates communications using three data types (voice data, facsimile data, and computer data), the invention is applicable to networks handling any type of data. Furthermore, the invention is not limited to its application only within a computer network, or only for data exchange between devices of a specific type. Rather, the invention is meant to be general in nature and may be applied to any type of networking application, architecture or device which requires limited amounts of resources to be reserved for specific applications or streams of data over various periods of time or in response to various events.

Also, the extensions to RSVP which include future bandwidth modification information are not meant to be limited to only reserving or adjusting amounts of reserved bandwidth. Rather, other resources in a data communications device can be processed or modified at times specified by commands including this type of information. For instance, if two different routing protocols can be used by a network device such as a router, the selection of a protocol may be time or policy based and a protocol other than RSVP may be used which includes commands or network policies including modification information which specifies, for example, that at certain times of the day or in response to certain events, the routing protocol in use should be switched to another protocol. This modification to the invention is given by way of example only, and other extensions of the invention of this sort will now be apparent to those skilled in the art of networking, network device and protocol design, implementation, and operation.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. In a data communications device, a method to allocate bandwidth for transferring data, the method comprising:
based on bandwidth allocation information, programming the data communications device with a first configuration to provide a first throughput rate for an active session transferring data through the data communications device;
after instantiation of the active session and providing the first throughput rate, determining a bandwidth allocation modification to be made for the active session; and
in response to said determining, altering the first configuration to produce a second configuration in the data communications device to provide a second throughput rate for the active session transferring data through the data communications device;
wherein determining the bandwidth allocation modification to be made for the active session includes:
during the active session:
i) detecting an occurrence of an event identified in the bandwidth allocation information, the bandwidth allocation information being received prior to instantiation of the active session; and
ii) based on the occurrence of the event, identifying a bandwidth modification amount to change the first throughput rate in order to configure the data communications device to support the second throughput rate.

2. A method as in claim 1 further comprising:
at the data communications device, receiving the bandwidth allocation information associated with the active session prior to actually programming the data communications device with the first configuration and instantiation of the active session.

3. A method as in claim 1, wherein altering the first configuration includes:
modifying the first configuration at the data communications device without receiving further communications from sources external to the data communications device indicating how to modify the bandwidth allocation associated with the active session.

4. A method as in claim 1, wherein altering the first configuration at the data communications device occurs without receiving further communications from a host computer acting as at least one of a source and recipient of the data transferred through the data communications device.

5. A method as in claim 1 further comprising:
providing uninterrupted data transfers for the active session through the data communications device during a transition from the first configuration to the second configuration.

6. A method as in claim 1 further comprising:
maintaining the bandwidth allocation information at the data communications device, the bandwidth allocation information including bandwidth allocation modification information indicating an amount to modify currently allocated bandwidth associated with the active session in response to occurrence of a corresponding predetermined event.

7. A method as in claim 1, wherein detecting the occurrence of an event identified in the bandwidth allocation information includes detecting a time associated with implementing the second throughput rate at the data communications device.

8. A method as in claim 1 further comprising:
utilizing results from a bandwidth prediction algorithm to identify future events specifying when and how much to modify a bandwidth allocated for use by the active session, the bandwidth prediction algorithm providing a statistical analysis of a network in which the data communications device resides, the bandwidth prediction algorithm determining variations in bandwidth requirements for data types transferred over the network.

9. A method as in claim 1, receiving the bandwidth allocation information at the data communications device in the form of a network policy indicating when and by how much bandwidth the data communications device is to modify the amount of bandwidth allocated to the active session.

10. A method as in claim 9, wherein the network policy specifies a plurality of sessions of data communications, and for each of the plurality of sessions of data communication, also specifies various amounts of bandwidths to be allocated for each session of data communication at various times of operation of the data communications device.

11. A method as in claim 9, wherein the network policy specifies various amounts of bandwidth to be allocated at various times in a particular day according to a business cycle for a business operating the data communications device.

12. A method to allocate bandwidth for transferring data in a data communications device, the method comprising:
based on bandwidth allocation information, programming the data communications device with a first configuration to provide a first throughput rate for an active session transferring data through the data communications device;
after instantiation of the active session and providing the first throughput rate, determining a bandwidth allocation modification to be made for the active session;
in response to said determining, altering the first configuration to produce a second configuration in the data communications device to provide a second throughput rate for the active session transferring data through the data communications device; and
prior to instantiation of the active session and providing the first throughput rate, receiving the bandwidth allocation information in a form of a bandwidth reservation message identifying i) a particular data communication session to occur in the future, the particular data communication session eventually becoming the active session, ii) an amount of bandwidth to reserve in the data communications device for the particular data communication session, and iii) bandwidth allocation modification information which specifies predetermined event information upon which a future event causes modification to an amount of bandwidth associated with the particular data communication session.

13. The method of claim 12, wherein the predetermined event information defines a detectable business cycle and wherein the future event is a future time.

14. A method as in claim 12, wherein receiving the bandwidth allocation information in the form of a bandwidth reservation message includes receiving the bandwidth allocation information at the data communications device based on use of RSVP (Resource Reservation Protocol).

15. In a data communications device, a method of allocating bandwidth for transferring data, the method comprising:
based on bandwidth allocation information, programming the data communications device with a first configuration to provide a first throughput rate for an active session transferring the data through the data communications device;
during the active session and after providing the first throughput rate, detecting an occurrence of an event;
based on detecting the occurrence of the event, altering the first configuration to produce a second configuration in the data communications device in order to provide a second throughput rate for the active session transferring the data through the data communications device; and
utilizing results from a bandwidth prediction algorithm to identify future events specifying when and how much to modify a bandwidth allocated for use by the active session, the bandwidth prediction algorithm providing a statistical analysis of a network in which the data communications device resides, the bandwidth prediction algorithm determining variations in bandwidth requirements for data types transferred over the network.

16. A method to reserve bandwidth for use in a network, the method comprising:
generating a message including:
i) a reservation request message indicating an amount of bandwidth to be reserved for a session of data communication,
ii) a future time at which to modify the amount of bandwidth reserved for the session of data communication,
iii) an amount by which to modify the amount of bandwidth reserved for the session of data communication upon occurrence of the future time; and
transmitting the message to a data communications device in the network to reserve bandwidth to reserve bandwidth for transferring data through the data communications device.

17. A method comprising:
generating a message to configure a data communications device to transfer data through a network, the message including: i) an identification of a data communication session; and ii) future bandwidth allocation modification information associated with the identification of the data communication session, the future bandwidth allocation modification information allowing the data communications device to determine a future event, the occurrence of which causes the data communications device to modify an amount of bandwidth allocated to the data communication session, the future bandwidth allocation modification information including an indication of how much to modify the amount of bandwidth reserved for the data communication session; and
transmitting the message to the data communications device through the network.

18. A method as in claim 17, wherein the identification of the data communication session and the future bandwidth allocation modification information are embodied in an RSVP (Resource Reservation Protocol) bandwidth message.

19. A data communications device comprising:
a data transporter to support transferring data through the data communications device;
a bandwidth reservation processor coupled to the data transporter, a combination of the data transporter and bandwidth reservation processor supporting operations of:
based on bandwidth allocation information, programming the data transporter according to a first configuration to provide a first throughput rate for an active session transferring data through the data communications device;
after instantiation of the active session and providing the first throughput rate, determining a bandwidth allocation modification to be made for the active session;
in response to said determining, altering the first configuration to produce a second configuration in the data communications device to provide a second throughput rate for the active session transferring data through the data communications device;
receiving the bandwidth allocation information at the data communications device in the form of a network policy indicating when and by how much bandwidth the data communications device is to modify the amount of bandwidth allocated to the active session; and
wherein the network policy specifies a plurality of sessions of data communications, and for each of the plurality of sessions of data communication, also specifies various amounts of bandwidths to be allocated for each session of data communication at various times of operation of the data communications device.

20. A data communications device as in claim 19 further supporting operations of:
   at the data communications device, receiving the bandwidth allocation information associated with the active session prior to actually programming the data communications device with the first configuration and instantiation of the active session.

21. A data communications device as in claim 19, wherein altering the first configuration includes:
   modifying the first configuration at the data communications device without receiving further communications from sources external to the data communications device indicating how to modify the bandwidth allocation associated with the active session.

22. A data communications device as in claim 19, wherein altering the first configuration at the data communications device occurs without receiving further communications from a host computer acting as at least one of a source and recipient of the data transferred through the data communications device.

23. A data communications device as in claim 19 further supporting operations of:
   providing uninterrupted data transfers for the active session through the data communications device during a transition from the first configuration to the second configuration.

24. A data communications device as in claim 19 further supporting operations of:
   maintaining the bandwidth allocation information at the data communications device, the bandwidth allocation information including bandwidth allocation modification information indicating an amount to modify currently allocated bandwidth associated with the active session in response to occurrence of a corresponding predetermined event.

25. A data communications device as in claim 19 further supporting operations of:
   prior to instantiation of the active session and providing the first throughput rate, receiving the bandwidth allocation information in a form of a bandwidth reservation message identifying i) a particular data communication session to occur in the future, the particular data communication session eventually becoming the active session, ii) an amount of bandwidth to reserve in the data communications device for the particular data communication session, and iii) bandwidth allocation modification information which specifies predetermined event information upon which a future event causes modification to an amount of bandwidth associated with the particular data communication session.

26. The data communications device of claim 25, wherein the predetermined event information defines a detectable business cycle and wherein the future event is a future time.

27. A data communications device as in claim 25, wherein receiving the bandwidth allocation information in the form of a bandwidth reservation message includes receiving the bandwidth allocation information at the data communications device based on use of RSVP (Resource Reservation Protocol).

28. A data communications device as in claim 19, wherein determining the bandwidth allocation modification to be made for the active session, during the active session, includes:
   during the active session:
   i) detecting an occurrence of an event identified in the bandwidth allocation information, the bandwidth allocation information being received prior to instantiation of the active session; and
   ii) based on the occurrence of the event, identifying a bandwidth modification amount to change the first throughput rate in order to configure the data communications device to support the second throughput rate.

29. A data communications device as in claim 28, wherein detecting the occurrence of an event identified in the bandwidth allocation information includes detecting a time associated with implementing the second throughput rate at the data communications device.

30. A data communications device as in claim 19 further supporting operations of:
   utilizing results from a bandwidth prediction algorithm to identify future events specifying when and how much to modify a bandwidth allocated for use by the active session, the bandwidth prediction algorithm providing a statistical analysis of a network in which the data communications device resides, the bandwidth prediction algorithm determining variations in bandwidth requirements for data types transferred over the network.

31. A data communications device as in claim 19, wherein the network policy specifies various amounts of bandwidth to be allocated at various times in a particular day according to a business cycle for a business operating the data communications device.

32. A computer program product having a computer-readable medium including computer program logic encoded thereon for allocating bandwidth in a data communications device, such that the computer program logic, when executed on at least one processing unit with the data communications device, causes the at least one processing unit to perform the steps of:
   based on bandwidth allocation information, programming the data communications device with a first configuration to provide a first throughput rate for an active session transferring data through the data communications device;
   after instantiation of the active session and providing the first throughput rate, determining a bandwidth allocation modification to be made for the active session; and
   in response to said determining, altering the first configuration to produce a second configuration in the data communications device to provide a second throughput rate for the active session transferring data through the data communications device;
   wherein determining the bandwidth allocation modification includes:
   during the active session:
   i) detecting an occurrence of an event; and
   ii) processing the bandwidth allocation information to identify the second throughput rate to be used for transferring data through the data communications device.

* * * * *